Oct. 24, 1950 P. GUTH 2,527,359
DISPENSING AND FILLING VALVE FOR VOLATILE
LIQUIDS WITH FILLING GAUGE
Filed Nov. 26, 1947 2 Sheets-Sheet 1
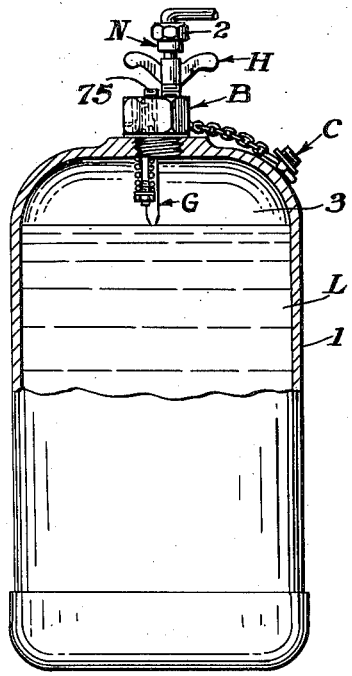
Fig. 1
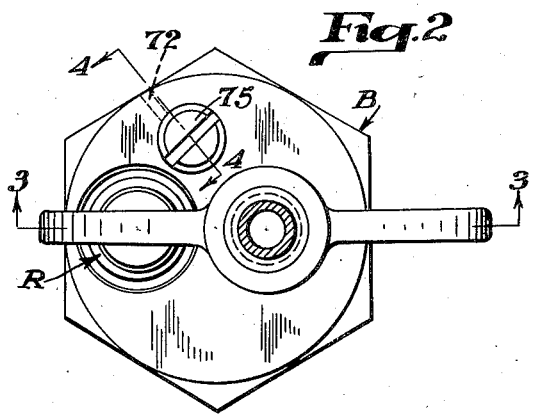
Fig. 2
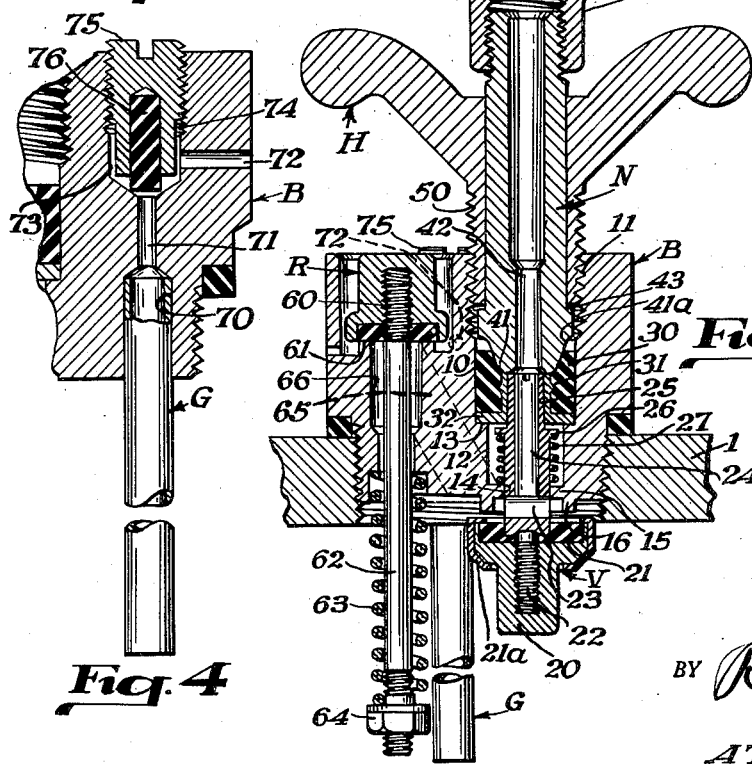
Fig. 3
Fig. 4
INVENTOR.
PAUL GUTH.
BY Richey & Watts
ATTORNEYS.

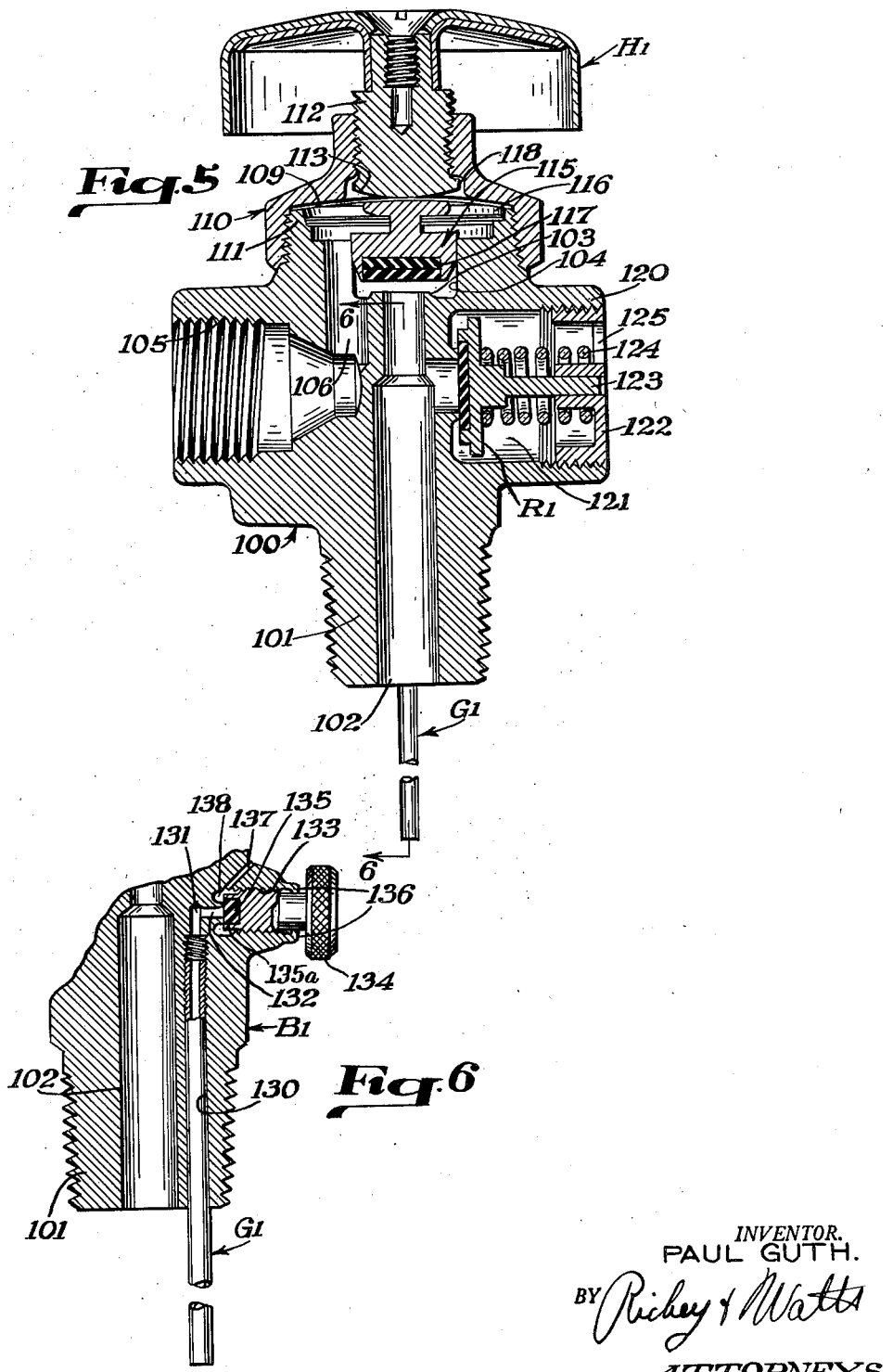

Patented Oct. 24, 1950

2,527,359

UNITED STATES PATENT OFFICE 2,527,359

DISPENSING AND FILLING VALVE FOR VOLATILE LIQUIDS WITH FILLING GAUGE

Paul Guth, Cleveland, Ohio, assignor to The Weatherhead Company, Cleveland, Ohio, a corporation of Ohio Application November 26, 1947, Serial No. 788,126

2 Claims. (Cl. 62—1)

1

This invention relates to filling and dispensing valves for use in connection with individual consumer's cylinders for liquified petroleum gas. More specifically, this invention relates to a valve of the nature described which facilitates gravity filling of the cylinder with the liquified gas and which eliminates the need of weighing the cylinder during the filling operation to determine when the desired quantity of fluid has been introduced into the cylinder.

It has been customary in the industry to supply a line of tanks for use by the consumer which are periodically replaced with full tanks or refilled on location by the supplier. It has been the practice to fit the tanks with a valve which permits both filling the tank and dispensing the gas from the tank and the tanks have been customarily weighed during the filling operation to provide an indication of the amount of fluid in the tank. In these systems, the fluid has been pumped into the consumer's tank against the vapor pressure existing within the tank. This method has several disadvantages: first, it requires pressure filling of the tank; secondly, it requires cumbersome and costly scales for weighing the tank to ascertain the liquid level therein; and thirdly, it offers a possibility of overfilling the tank which might lead to some danger in that when the proper amount of vapor space is not provided, excessive pressure might develop within the tank if a relief valve is not provided or if such a valve is provided and jams or freezes closed. On the other hand, when filling a tank fitted with a valve formed in accordance with the present invention, there is no possibility of overfilling the tank due to faulty manipulation of or damage to the scales because scales are not needed as an indication of the liquid level within the tank. Briefly, these advantages of the invention are effected by providing a filling and dispensing valve which incorporates a gauge tube extending into the tank far enough so that the end of the tube is at the desired maximum liquid level. With this construction, means are provided for opening the gauge to atmosphere during the filling operation to provide a vent for the tank and so permit gravity filling thereof. Furthermore, when the liquid level reaches the predetermined maximum level, it reaches the gauge tube, and upon addition of a slight quantity of additional liquid, the vapor above the liquid is trapped. Vapor pressure within the tank now forces liquid up through the tube and out of the valve. This gives the operator an indication that the tank is properly filled, whereupon the supply of liquid is shut off and the gauge tube closed.

2

Another object resides in reducing the number of taps that must be made into the tank. This is accomplished by providing a novel valve which incorporates the gauge tube.

A further object of a modified form resides in simplifying the manner by which a test plug is retained in the valve body.

A detailed description of a preferred embodiment of my invention appears in the following specification.

In the drawings:

Fig. 1 illustrates a tank fitting with one form of valve made in accordance with the invention;

Fig. 2 is a plan view of the valve with the cap and nipple removed;

Fig. 3 is a vertical section taken on 3—3 of Fig. 2 with the dispensing nipple in place;

Fig. 4 is a fragmentary section through the gauge tube taken on 4—4 of Fig. 2;

Fig. 5 is a vertical section through a modified form commonly referred to as a cylinder valve; and Fig. 6 is a fragmentary section through the gauge tube in the modified form.

Referring to the forms shown in Figs. 1 to 4, the consumer's tank I is fitted with the filling and dispensing valve B which has a filling and dispensing nipple N attached to the valve B by means of handle H. A fill hose may be connected to the nipple N by means of fitting 2 and unseats a valve V. As the liquid L enters the tank, volume 3 (which contains vapor) is gradually reduced until the liquid level reaches the gauge tube G. At this point, a small quantity of liquid will be seen to emerge from the valve body B, indicating that the tank is full.

The filling and dispensing valve shown in Figs. 1 to 4 includes a block-like valve body B which mounts a sealing valve V and a relief valve R. A threaded cap C is provided to close off the filling and dispensing port in the valve body when the container is not in use or during shipment thereof. Valve body B is threaded for attachment to the container I and has a through bore 10 having a threaded portion 11 leading from its outer face which receives the cap C when it is employed and also receives the operating handle H (Fig. 2) used to fit the nipple into the valve. A bore 12 communicates with bore 10 to provide a shoulder 13 and similarly a bore 14 of reduced section communicates with bore 12 to provide a second shoulder and guiding flange 15 for the valve stem. An external valve seat 16 is formed at the underface of the valve body and the passageway through the body may be closed off by the sealing valve assembly V. The latter assembly includes a member 20 on which the sealing disc 21 is mounted by retainer 21a, and a valve stem is threaded to the member 20 as at 22. The valve stem extends into the passageway through the valve body and includes the cross bore 23 communicating with an axial bore 24 for passing fluid through the valve. The upper portion of the valve stem is reduced as at 25 and an intermediate flange 26 is provided on the stem to provide an upper spring seat. The closing spring 27 rests against the upper seat 26 and against the flange 15 integral with the body so that the valve is normally urged into sealing relationship with the seat formed on the body. In order to effect a sealing between the nipple and the valve before the sealing valve is opened, a rubber-like annular sealing washer 30 is attached to or bonded to the metal sleeve member 31 and the assembly pressed into bore 10 in fluid-tight engagement therewith. The sleeve member 31 includes a lower flange 32 which abuts shoulder 13 upon assembly of the valve. The sealing member 30 has a surface 41 for cooperation with a complementary surface 41a formed at the lower end of the nipple N. The nipple N is of a standard construction and need not be specifically machined nor modified to work with the valve of this invention. Nipple N has a fluid conducting aperture 42 and is formed with a shoulder 43 for engagement with the threaded shank 50 of the handle H. The relief valve R is provided to relieve excess pressure in the container and includes the valve member 60 cooperating with the valve seat 61 formed on the body. Valve member 60 is normally biased to the closed position by spring 63 surrounding valve stem 62 and acting on the valve body and adjusting nut 64. Passageways 65 are formed to provide communication between the inside of the container and the relief valve chamber 66.

In order to provide a visual indication that the liquid level within the tank has reached the predetermined level a fill gauge and vent tube G is provided. Valve body B is bored as at 70 to receive the guage tube G which may be brazed or silver-soldered in place. A vapor relief and liquid level indicating port in the body is provided by passageways 71 and 72 which communicate with an outer valve receiving bore 73 threaded as at 74. A closure valve 75 is threaded in bore 73 and carries a rubber sealing plug 76 for closing off communication between passageways 71 and 72 except during the filling operation. The length of the gauge tube G is chosen so that a predetermined volume of vapor 3 (Fig. 1) remains in the tank at the time the level of liquid L reaches the tube.

Assume that the tank has been in use and is now to be filled. Nipple N which has been attached by means of handle H is backed off so that valve V closes. The dispensing conduit is replaced by the filling hose and the handle H tightened. As the nipple portion 41a approaches the sealing member 30 it makes sealing contact therewith before the end of the nipple engages the upper end of the valve stem 25. By the time the end of the nipple has engaged the end of the valve stem, the fluid seal between the nipple and the sealing member 30 is re-established. After the sealing valve is cracked, further motion of the nipple brings it fully open until a point is reached wherein the end of the nipple engages the upper end of the sleeve 31, with which the operator becomes aware that the connector is completely assembled.

The plug 75 for sealing off the gauge tube G may be opened at this time to vent the tank to atmosphere by means of port 72, with which the fluid may be supplied under the force of gravity by means of the fill hose to the tank. As filling continues the gauge tube vents the vapor displaced by the incoming liquid until the liquid level reaches that shown in Fig. 1. Further filling traps vapor in volume 3 and the vapor pressure forces liquid up through the gauge tube out port 72 which gives the operator an indication that the tank is properly filled. The operator then shuts off the source of fluid supply, turns down plug 75 to seal the gauge tube, and either removes nipple N from the valve or loosens it and disconnects the hose by means of fitting 2 to attach the consumer's hose. Thus, it can be seen that when employing applicant's valve, not only is the tank readily filled by gravity, but in addition the proper amount of liquid will always be introduced without need for scales or other weighing devices. Furthermore, there will always be provided the proper minimum volume 3 for the vapor so that excessive or dangerous pressure cannot develop within the tank. The gauge tube may be cut off to the proper length for a given tank or it may be supplied longer than is required whereby its length may be adjusted for any particular size tank normally employed in such systems.

Figs. 5 and 6 illustrate a cylinder valve embodying the invention. Here the body $B_1$ has threaded nipple 101 for connection to the tank. It will be seen that the diameter of the threaded boss and tank may be much smaller when this kind of valve is employed than when the valve previously illustrated is fitted. The valve body has a bore 102 for filling and dispensing which terminates in a valve seat 103 lying within an enlarged bore 104. Valve member 115 rides in the bore 104 and may be manipulated to close off bore 102 by engagement with seat 103. Valve member 115 has a suitable resilient valve seat portion 117 to insure a tight sealing action. The threaded filling and dispensing nipple 105 communicates with the vertical bore 106, which (when the valve member 115 is unseated) establishes communication between the nipple 105 and the bore 102 in the body. A cap member 110 is threaded to nipple 111 formed at the top of the body, and cap member 110 threadedly supports the operating button 112 as well as clamping a diaphragm 109 against the nipple. Button 112 has a lower face 113 formed to move a head on the valve member 115, the force being transmitted through the diaphragm. I prefer that the button be necked down to receive flat springs 116 for urging the valve toward its open position. The operating button 112 may be formed with a flange member 118 which may be backed up against a mating portion of cap 110 to insure a seal when the valve is fully opened.

A relief valve $R_1$ is likewise incorporated in this form of valve. Relief nipple 120 has a bore 121 to receive the relief valve $R_1$. The valve member $R_1$ is retained by means of threaded plug 122 which is bored to receive guiding stem 123 formed on the valve member. Spring 124 urges the valve toward its closed position and apertures 125 in the plug permit the escape of vapor when the relief valve is opened under excessive pressure.

The gauge tube $G_1$ (as best seen in Fig. 6) may be threaded or otherwise attached in a bore 130 extending through nipple 101. The upper portion 131 of bore 130 communicates with an outlet port 132 which is surrounded by a valve seat formed within a threaded bore 133 formed in the body. A closure plug or valve 134 is threaded into bore 133 and carries a sealing means 135 for closing off the port 132 except during the filling operation. The valve has a cylindrical portion 135a of a diameter less than the pitch diameter of the threads Flanges 136 are bent or spun down so as to be of smaller diameter than the threads on the plug 134 after the plug is threaded into the body. This provides a simple and effective retaining means for the plug. A counterbore 138 surrounds the valve seat and a bleed passageway 137 leads from chamber 138 through the body wall.

In the filling operation, the cylinder valve shown in Figs. 5 and 6 is fitted with a filling hose connected to nipple 105 and the valve member 115 is manually withdrawn from its seat. Likewise, closure plug 134 is unseated to provide a vent for the gauge tube through the valve body. Fluid may then enter the tank under the force of gravity and, as described in connection with the preferred form, when liquid level reaches the tube the trapped vapor pressure will expell a certain amount of liquid from vent port 137, giving an indication that the filling is complete and that the source should be cut off. Plug 134 may then be turned to seal port 132 and valve member 115 seated by screwing down handle member H', with which the filling nozzle may be disconnected from nipple 105 and the service line connected in its place. It is noted that the gauge structure is incorporated without enlarging the mounting nipple 101 of the valve, so that the valve can replace any standard valve normally employed for filling the tank. The same is true of the other form, so that a valve made in accordance with this invention may be readily substituted for a valve that necessitates pressure filling and requires weighing scales to provide an indication as to when the tank is properly filled.

Having completely described the preferred form of my invention, I contemplate that modifications may be made by those skilled in the art without affecting the mode of operation of the device and accordingly without altering the nature of the invention. For this reason I contemplate that the appended claims and not the aforesaid description be determinative of the scope of my invention.

What I claim is:

1. For use with containers holding volatile liquids, a filling and dispensing valve comprising a valve body formed with means for mounting it on the container with a body portion subjected to vapor pressure in the container, a filling and dispensing passageway through said body and body portion, adjustable valve means for closing off said passageway, means for connecting a fluid conduit to said body for communication with said passageway, a nipple extending from said body and having a threaded bore leading inwardly, a smaller bore continuing from said threaded bore and leading through said body portion subjected to vapor pressure, extension tube means leading from said smaller bore and adapted to extend into the container a distance equal to the desired minimum depth of vapor, a bleed passageway leading from an inner portion of said threaded bore through a wall of said body, and a valve threaded in said bore for selectively sealing off said smaller bore from said bleed passageway, said valve comprising an inner threaded section and an outer cylindrical section of reduced diameter, said nipple having a terminal flange receiving said cylindrical section and including a portion of a smaller radius than the threaded section to retain said valve in place.

2. For use with containers holding liquified petroleum gas under pressure, a gauging valve comprising a valve body formed with means for mounting it on the container with a body portion subjected to vapor pressure in the container, a nipple extending from said body and having a threaded bore leading inwardly, a smaller bore continuing from said threaded bore and leading through said body portion subjected to vapor pressure, a valve seat surrounding said smaller bore, extension tube means leading from said smaller bore and adapted to extend into the container a distance equal to the desired minimum depth of vapor, a bleed passageway leading from an inner portion of said threaded bore through a wall of said body, and a valve threaded in said bore and having sealing means for selectively sealing off said smaller bore from said bleed passageway, said valve comprising an inner threaded section and an outer cylindrical section of reduced diameter, said nipple having a terminal flange receiving said cylindrical section and including a portion of a smaller radius than the threaded section to retain said valve in place, said valve having an outer grip portion, the bleed passageway in said body extending so that its axis clears said grip portion, said valve being solid so that liquid in said threaded bore cannot pass through the valve.

PAUL GUTH.

REFERENCES CITED

The following references are of record in the file of this patent:

UNITED STATES PATENTS

| Number | Name | Date |
|---|---|---|
| 1,269,940 | Keiner | June 18, 1918 |
| 1,423,418 | Grikscheit | July 18, 1922 |
| 2,283,970 | Buttner | May 26, 1942 |
| 2,307,309 | Thomas | Jan. 5, 1943 |
| 2,440,230 | Buttner | Apr. 20, 1948 |